United States Patent
Meyer

(10) Patent No.: US 7,448,821 B2
(45) Date of Patent: Nov. 11, 2008

(54) ARRANGEMENT FOR CONNECTING A TUBULAR ELEMENT TO A BODY EXTENDING INTO THE SAME

(75) Inventor: Hermann Meyer, Schneizlreuth (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 819 days.

(21) Appl. No.: 10/798,109

(22) Filed: Mar. 10, 2004

(65) Prior Publication Data

US 2004/0177587 A1  Sep. 16, 2004

(30) Foreign Application Priority Data

Mar. 10, 2003 (DE) ................. 103 11 572

(51) Int. Cl.
- F16D 1/00 (2006.01)
- F16D 3/00 (2006.01)
- F16G 11/04 (2006.01)
- B25G 3/24 (2006.01)
- F16B 2/02 (2006.01)
- F16B 7/04 (2006.01)

(52) U.S. Cl. .................. 403/290; 403/185; 403/289; 464/182

(58) Field of Classification Search ............. 52/583.1, 52/677, 726.1, 740.1, 740.7; 403/234, 235, 403/278, 279, 281, 185, 289, 290; 464/182
See application file for complete search history.

(56) References Cited

U.S. PATENT DOCUMENTS

| 3,894,402 | A | | 7/1975 | Lundtoft |
| 4,603,998 | A | * | 8/1986 | Bober et al. ............. 403/322.2 |
| 4,692,051 | A | * | 9/1987 | Stansbury et al. ............... 403/3 |
| 4,918,881 | A | * | 4/1990 | Cottle et al. ...................... 52/65 |
| 5,035,528 | A | * | 7/1991 | Thau .......................... 403/290 |
| 5,085,535 | A | | 2/1992 | Solberg et al. |
| 5,909,980 | A | * | 6/1999 | Holdsworth ................. 403/362 |
| 5,974,761 | A | * | 11/1999 | Mochizuki et al. .......... 52/740.1 |
| 6,413,006 | B1 | * | 7/2002 | Neugart ...................... 403/344 |

(Continued)

FOREIGN PATENT DOCUMENTS

CH       640313       12/1983

(Continued)

OTHER PUBLICATIONS

DRS 60. Incrementale Encoder mit Nullimpuls-Teach. In: Sick-Stegmann, Datenblatt, 20.03.03, www.sick-stegmann.de.

(Continued)

Primary Examiner—Brian Glessner
Assistant Examiner—Branon C Painter
(74) Attorney, Agent, or Firm—Kenyon & Kenyon LLP

(57) ABSTRACT

An arrangement for connecting a tubular element to a body extending into the same using a tensioning ring, which, via its inner surface, embraces the outer wall of the tubular element, extends axially along the tubular element, and applies clamping forces thereto such that the tubular element acts via its inner wall on the body situated in the tubular element, clamping the same. The tensioning ring rests against the outer wall of the tubular element with only one axial partial section of its inner surface and exerts a clamping action thereon.

22 Claims, 3 Drawing Sheets

U.S. PATENT DOCUMENTS 6,679,024 B2 * 1/2004 Dahl ..................... 52/726.1
2003/0063948 A1 4/2003 Liu

FOREIGN PATENT DOCUMENTS

DE    6604702    2/1970
DE    24 32 988    5/1975
GB    2 013 508    4/1980

OTHER PUBLICATIONS

Datasheet, "DRS 60: Incremental Encoders with Zero-Pulse-Teach," Sick AG/Stegmann GmbH & Co. KG; accessed on May 17, 2004 at "http://www.sick.de/de/products/categories/industrial/encoder/incrementalencoder/drs60/en.toolboxpar.0010.file.tmp/DRS%2060_Data_sheet_Englisch.pdf".

* cited by examiner

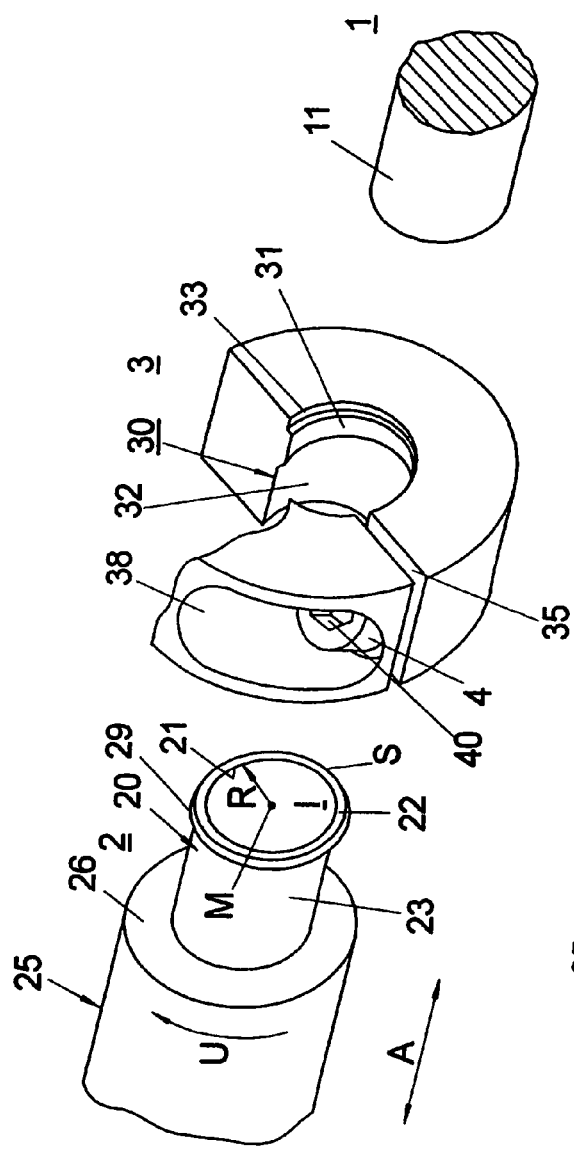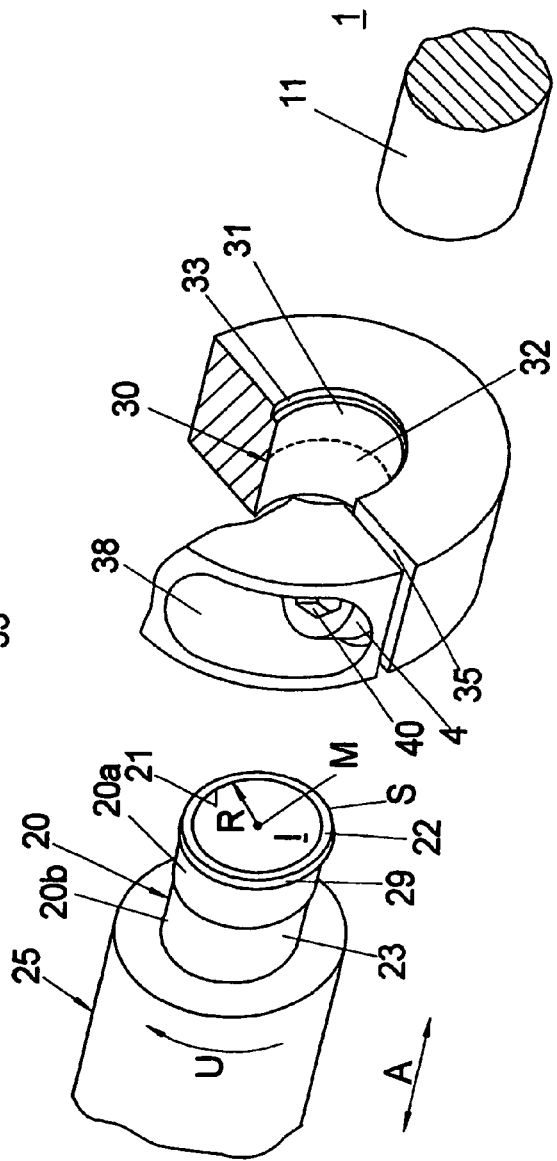

ARRANGEMENT FOR CONNECTING A TUBULAR ELEMENT TO A BODY EXTENDING INTO THE SAME

CROSS-REFERENCE TO RELATED APPLICATIONS

The present application claims priority to Application No. 103 11 572.2, filed in the Federal Republic of Germany on Mar. 10, 2003, which is expressly incorporated herein in its entirety by reference thereto.

FIELD OF THE INVENTION

The present invention is directed to an arrangement for connecting a tubular element to a body extending into the tubular element.

BACKGROUND INFORMATION

An arrangement for connecting a tubular element to a body extending into the tubular element may include a tensioning or clamping ring, which embraces, by its inner surface, the outer wall of the tubular element, extends axially over one region of the tubular element, and applies (radially inwardly acting) clamping forces to the tubular element such that the tubular element acts by its inner wall on the body situated in the tubular element, clamping the same.

An arrangement of this kind may be used, in particular, to clamp a hollow shaft of a rotary encoder to the drive shaft of a machine, whose angle of rotation is to be determined by the rotary encoder; see, for example, the prospectus "Hohlwellen Inkrementalgeber" (Hollow-Shaft Incremental Encoder) of Max Stegmann GmbH from 1996.

SUMMARY

It is an aspect of the present invention to provide an arrangement for connecting a tubular element to a body that extends into the same.

In accordance with an example embodiment of the present invention, the tensioning ring fits on this outer wall by only one axial partial section of its inner surface facing the outer wall of the tubular element and exerts a clamping action only via this axial partial section of its inner surface on the outer wall of the tubular element.

Thus, in the arrangement of an example embodiment of the present invention, only one axial partial section of the inner surface of the tensioning ring is used as a clamping surface that fits on the outer wall of the tubular element, and exerts inwardly directed forces, i.e., a suitable torque on the same. On the other hand, the partial section(s) of the inner surface of the tensioning ring axially contiguous thereto (thus along the longitudinal axis of the tubular element) do not act directly on the outer wall of the tubular element.

In an exemplary embodiment of the present invention, the reduced extent or dimensions of the effective clamping surface of the tensioning ring in the axial direction may enable the clamping forces to be selectively introduced by the tensioning ring into the tubular element such that good lever ratios may be attained for the targeted clamping effect, when working with a small required space. In this manner, a substantial share of the forces produced in response to actuation of the tensioning ring by a suitable clamping element (for example, a tangentially acting clamping screw) may be prevented from leading to a mere (elastic) deformation of the tensioning ring and, respectively, of the tubular element, and from thereby diminishing the maximally transmittable torque which is supposed to effect the fastening of the body extending into the tubular element, while clamping the same. At the same time, however, the tensioning ring may be able to have a stable enough design, to enable clamping forces of suitable magnitude to be produced using a clamping screw, etc. This is because the tensioning ring itself is in no way limited to the axial extent of the effective inner clamping surface, but rather, in accordance with an example embodiment of the present invention, has a larger extent in the axial direction, so that a clamping screw of suitable size is able to be applied here.

Thus, on the one hand, the tensioning ring may be designed to be stable enough to handle the introduction of substantial torques by a clamping element and, at the same time, have an effective clamping surface of a limited axial extent, which, when working with a small required space, may ensure an optimal transmission of force and, respectively, torque for a clamping-type fastening of the tubular element to the body extending into the same.

The arrangement according to an example embodiment of the present invention may be suited, in particular, for connecting a hollow cylindrical element in the form of a hollow shaft to a cylindrical body, in the form of a drive shaft, positioned in this element. This arrangement may be used to fasten the hollow shaft of a rotary encoder to the drive shaft of a machine, clamping the same, in order to connect the drive shaft in question to an angle-of-rotation measurement system.

In an example embodiment of the present invention, it may be important that the axial extent of the axial partial section of the inner surface of the tensioning ring (effective clamping surface) which actually rests against the outer wall of the tubular element, differ substantially from the axial extent of the entire inner surface of the tensioning ring, e.g., that it be substantially shorter in the axial direction than the total inner surface of the tensioning ring. Thus, the axial extent of the effective clamping surface of the tensioning ring may be less than 75%, e.g., less than 50% of the axial extent of the entire inner surface of the tensioning ring.

In accordance with an example embodiment of the present invention, the distance of the inner surface of the tensioning ring from the center axis of the tubular element is smaller in its first axial partial section forming the effective clamping surface than it is in the other remaining axial sections in which it does not rest against the outer wall of the tubular element. This may be achieved, for example, by providing the tensioning ring with a cut-out, on its inner surface in the area of the at least one further axial section.

In accordance with an example embodiment of the present invention, the distance of the outer wall of the tubular element from the center axis of the tubular element is greater in the area in which it rests against the first axial partial section of the tensioning ring being used as an effective clamping surface, than it is in the areas which are embraced by the inner surface of the tensioning ring, but do not rest against the same. This may be achieved, for example, in that the tubular element, in the area of its outer wall which rests against the effective clamping surface of the tensioning ring, has a thickened region or an outwardly projecting protuberance.

An example embodiment of the present invention may provide for the tensioning ring to be situated at an unattached end of the tubular element, e.g., that axial section of the inner surface of the tensioning ring forming the effective clamping surface being positioned as closely as possible to the end face of that unattached end. This may result in an especially good lever action for the desired clamp connection between the tubular element and the body extending into the same, and in minimal losses of force as a consequence of a deformation of the tubular element. In addition, the strains occurring in the tubular element and, thus, the danger of a potential fatigue break may be reduced. This may apply especially to a design where the tubular element is substantially more thin-walled in the area in which it is surrounded by the tensioning ring than in the remaining areas, or to a design where it has (for example, axially running) slots there.

To axially secure the tensioning ring to the tubular element (protection against loss), an outwardly protruding, e.g., circumferentially encircling projection in the form of a flange, may be provided on the unattached end of the tubular element, over which the tensioning ring is slid during assembly, while undergoing elastic expansion.

In addition, it may be provided that the effective clamping surface of the tensioning ring does not rest over its entire surface area against the outer wall of the tubular element—considered circumferentially—but merely at a plurality of clamping points, spaced apart, e.g., equidistantly, from one another. These clamping points may be constituted, for example, of inwardly directed projections of the inner surface of the tensioning ring, between each of which one weak spot is provided for forming a joint or articulation, for example, in the form of a slotted or thin-walled region of the tensioning ring.

In an example embodiment of the present invention, an arrangement adapted to connect a tubular element to a body extending into the tubular element, includes a tension ring adapted to embrace, by an inner surface, an outer wall of the tubular element, the tension ring adapted to extend axially along the tubular element and adapted to apply a clamp force to the tubular element so that the tubular element acts via an inner wall of the tubular element on the body extending into the tubular element to clamp the tubular element. The tension ring may be adapted to rest by only a first axial partial section of the inner surface against the outer wall of the tubular element and may be adapted to exert a clamp action on the outer wall of the tubular element.

The tubular element may include a hollow cylinder, e.g., a hollow shaft, and the body may include a cylindrical element, e.g., a drive shaft.

The tension ring may include at least one second axial section contiguous in an axial direction to the first axial section, and the at least one second axial section may be configured so that the inner surface of the tension ring does not rest against the outer wall of the tubular element.

An extent of the at least one second axial section in the axial direction may be greater than an axial extent of the first axial section.

The inner surface of the tension ring in the at least one second axial section may have a greater distance from a center axis of the tubular element than in the first axial section.

The tension ring may include a cut-out in the at least one second axial section, and the at least one second axial section may have a greater distance from the center axis of the tubular element than the first axial section.

A distance from a center axis of the tubular element to the outer wall of the tubular element, in an area of the outer wall of the tubular element against which the first axial section is configured to rest, may be larger than a distance from the center axis of the tubular element to the outer wall of the tubular element in an area embraced by the at least one second axial section.

In the area against which the first axial section is configured to rest against the outer wall of the tubular element, the tubular element may include a thickened region and/or an outwardly projecting protuberance.

The tension ring may be configured to be arranged at an unattached end of the tubular element.

The first axial section may be configured to face an end face of the unattached end of the tubular element.

At an end face of the unattached end, the tubular element may include an outwardly protruding projection, e.g., in the form of a circumferential flange configured to axially secure the tension ring.

At the unattached end, a wall of the tubular element on which the tension ring is to be positioned may include a smaller thickness than in a contiguous axial region of the tubular element.

The tubular element may include a shoulder in a transition area from an axial region of the unattached end to the contiguous axial region.

The tension ring may be configured to be positioned in an axial direction directly next to the shoulder, e.g., to rest against the shoulder.

The tension ring may include a plurality of clamp points spaced apart along a circumference of the tubular element configured to rest against the outer wall of the tubular element.

The inner surface of the tension ring may include three spaced apart clamp points along the circumference of the tubular element.

The clamp points may include a plurality of inwardly protruding projections of the inner surface of the tension ring integrally molded on the inner surface.

The clamp points may be spaced apart at a constant, equal distance from one another along the circumference of the tubular element at the inner surface of the tension ring.

The tension ring may include a weak spot, e.g., configured to operate as a joint, arranged between each two adjacent clamp points.

The arrangement may be adapted to connect a hollow shaft of a rotary encoder to a drive shaft of a machine.

In accordance with an example embodiment of the present invention, a device includes a tubular element, a body extending into the tubular element, and an arrangement adapted to connect the tubular element to the body. The arrangement may include a tension ring adapted to embrace, by an inner surface, an outer wall of the tubular element, the tension ring adapted to extend axially along the tubular element and adapted to apply a clamp force to the tubular element so that the tubular element acts via an inner wall of the tubular element on the body extending into the tubular element to clamp the tubular element. The tension ring may be adapted to rest by only a first axial partial section of the inner surface against the outer wall of the tubular element and may be adapted to exert a clamp action on the outer wall of the tubular element.

Other features and aspects are set forth below in the following description of exemplary embodiments of the present invention, in light of the Figures.

BRIEF DESCRIPTION OF THE DRAWINGS

FIG. 1 illustrates a schematic, perspective representation of a first exemplary embodiment of an arrangement for fastening a hollow shaft of a rotary encoder to a drive shaft, clamping the same, using a tensioning ring.

FIG. 2 illustrates a modification of the arrangement of FIG. 1, with respect to the design of the tensioning ring.

DETAILED DESCRIPTION

Figure 3:
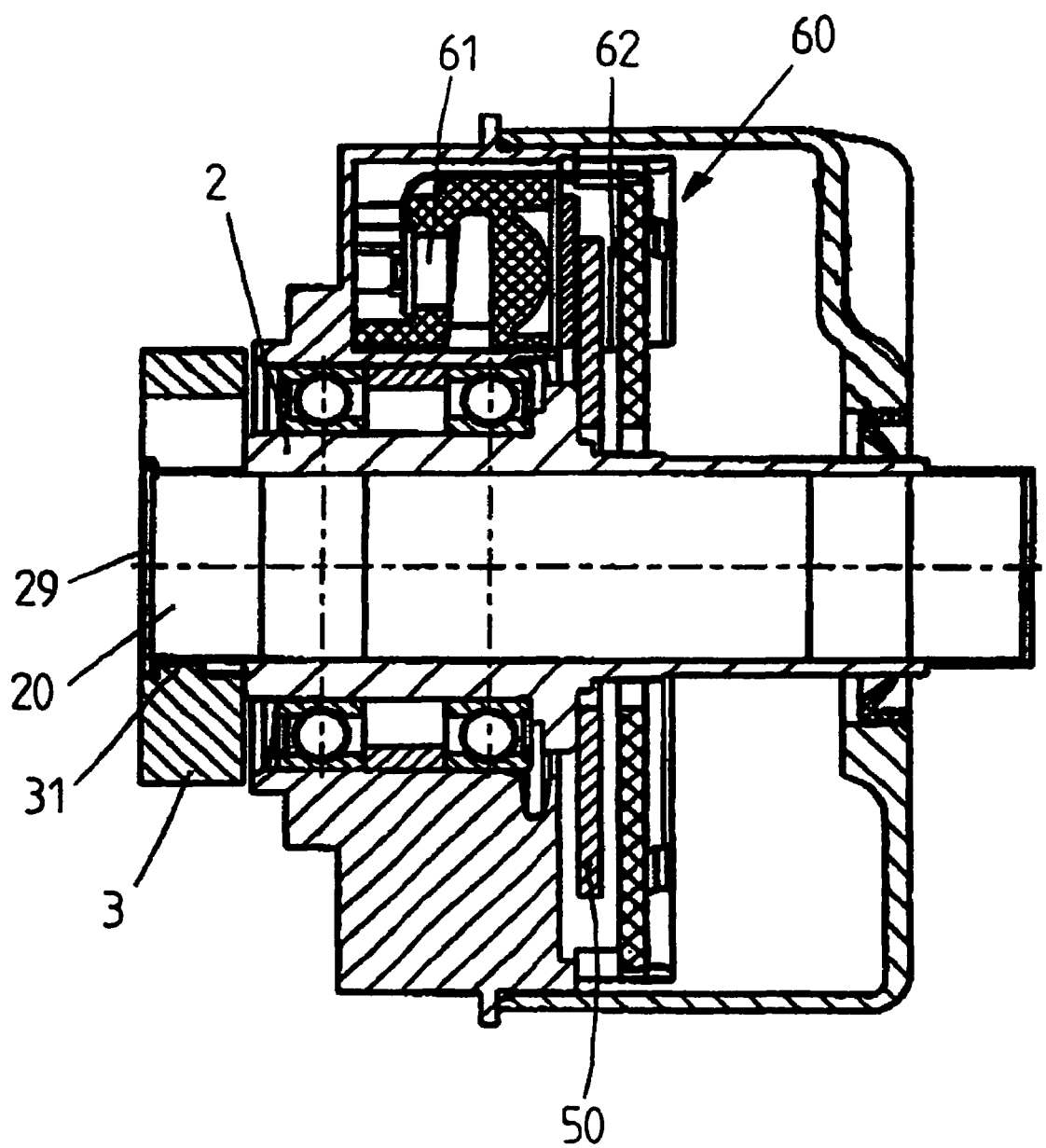
FIG. 3 illustrates a rotary encoder positioned on a hollow shaft, the hollow shaft having a tensioning ring which provides for fastening, with clamping action, to a drive shaft.

FIG. 1 schematically and perspectively shows a drive shaft 1 to which a hollow shaft 2 of a rotary encoder is to be secured with clamping action. For this purpose, drive shaft 1 is placed in inside space I of hollow shaft 2, so that the two shafts extends coaxially and outer wall 11 of drive shaft 1 rests against inner wall 21 of hollow shaft 2. A tensioning ring 3 is subsequently slid over an axial region 20 of hollow shaft 2 and its inner surface 30 embraces outer wall 23 of hollow shaft 2 in axial region 20, into which a clamping force is able to be introduced by a clamping screw 4 such that, under the action of the generated clamping forces, i.e., of the torque produced, hollow shaft 2 acts via its inner wall 21 on outer wall 11 of drive shaft 1, clamping drive shaft 1. In this manner, drive shaft 1 and hollow shaft 2 are connected to one another non-rotatably so as to be torsionally fixed.

It is also illustrated in FIG. 1 that, in axial region 20 onto which tensioning ring 3 is slid, wall 22 of hollow shaft 2 has a substantially smaller thickness than in region 25 that is contiguous thereto. As a result, a shoulder 26 is formed in the transition area between the two axial regions 20, 25 of hollow shaft 2. At the same time, axial region 20 of hollow shaft 2 forms an axial end section of hollow shaft 2, which is directly contiguous to a front end S of the hollow shaft.

In addition, on front end S of its end section 20, hollow shaft 2 may be provided with an outwardly protruding projection 29 in the form of a circumferential flange for axially securing tensioning ring 3.

Inner surface 30 of tensioning ring 3, which embraces outer wall 23 of hollow shaft 2, may be designed so that merely one axial partial section 31 of inner surface 30 is used as an effective clamping surface via which inner surface 30 of tensioning ring 3 rests against outer wall 23 of hollow shaft 2, clamping hollow shaft 2. This may be achieved in that, as the result of a cut-out formation, further axial partial section 32 of tensioning ring 3 that is contiguous in axial direction A to the partial section 31, is spaced at a greater distance in radial direction R from center axis M of hollow shaft 2 than is first axial partial section 31.

This is also true of a further partial section 33, which is axially contiguous, in opposite direction, to first axial partial section 31 and which is an undercut for accommodating, in a space-saving design, projection 29 of hollow shaft 2 used for axially securing tensioning ring 3, but which is not an axial partial section of tensioning ring 3 having substantial expansion in axial direction A. This may apply, rather, only to second axial partial section 32 which is contiguous to first axial partial section 31 of inner surface 30 forming the effective clamping surface toward shoulder 26 of hollow shaft 2. Second axial partial section 32 may have a larger extent in axial direction A than does first axial partial section 31.

Due to the formation of inner surface 30 of clamping element 3, as described above, the clamping element may act only with first axial partial section 31 of inner surface 30 on outer wall 23 of hollow shaft 2, clamping hollow shaft 2. Axial partial section 31 may be directly contiguous to end face S of unattached end section 20 of hollow shaft 2. Second axial partial section 32 of tensioning ring 3 may be associated with shoulder 26 of hollow shaft 2 and, e.g., may rest against hollow shaft 2, thereby achieving a defined, distinct positioning and space-saving placement of tensioning ring 3.

To produce the required clamping forces, tensioning ring 3 may have a radially running slot 35 through which a clamping screw 4 extends tangentially that is able to be screwed into a corresponding internal thread of tensioning ring 3. For this purpose, tensioning ring 3 may be provided with an actuating opening 38 via which an actuating section 40 of clamping screw 4 formed as an internal polygon is accessible for a tool. The clamping element in the form of a clamping screw 4 may be used for applying torque bias to tensioning ring 3; however, the clamping element itself may not act directly on outer wall 23 of hollow shaft 2. Thus, the clamping element may not rest against outer wall 23 of hollow shaft 2. For this, it is rather exclusively a partial section 31 of inner surface 30 of the basic structure of tensioning ring 3 that embraces hollow shaft 2 on its outer wall 23.

Due to the end section 20 of hollow shaft 2 having a thin-walled design over the entire axial extent of tensioning ring 3, however, tensioning ring 3 may rest with first partial section 31, acting as a clamping surface, of its inner surface 30 only against one axial partial area of end section 20. An optimal lever arm may be produced (in the axial direction) for selectively introducing the clamping force produced by tensioning ring 3 into the clamp connection between hollow shaft 2 and drive shaft 1 (selective torque transmission). In particular, losses of force may be avoided which may otherwise only contribute to a deformation of tensioning ring 3 or of hollow shaft 2 without affecting the clamp connection between drive shaft 1 and hollow shaft 2. Therefore, the pretensioning force of the clamping element may be utilized in a substantially lossless manner to achieve the clamping action between hollow shaft 2 and drive shaft 1. In the area of shoulder 26, at the transition of thin-walled end section 20 to thicker-walled parts 25 of hollow shaft 2, hollow shaft 2 may be the most rigid, so that no deformation forces may be transmitted there. Optimization of the available lever arm for producing the clamp connection between hollow shaft 2 and drive shaft 1 may be achieved while working with minimal required space in axial direction A. The extent, elongation and/or dimensions of thin-walled end section 20 of hollow shaft 2 in axial direction A may correspond to that of tensioning ring 3 in this direction. The lever action that is favorable for producing the clamping-type connection may be achieved in that inner surface 30 of tensioning ring 3 may rest via its partial section 31 set apart from shoulder 26 of hollow shaft 2 against outer wall 23 of hollow shaft 2. To achieve a comparable lever action given an uninterrupted contacting in the axial direction of inner surface 30 of tensioning ring 3 on outer wall 23 of hollow shaft 2, thin-walled end section 20 of hollow shaft 2 may have to have a considerably longer design in axial direction A, to enable a suitable lever arm to be made available between shoulder 26 of hollow shaft 2 and tensioning ring 3 in axial direction A.

The result may be attained that, using the arrangement illustrated in FIG. 1 for securing a hollow shaft 2 of a rotary encoder to a drive shaft, while working with a small required space, the clamping forces produced by tensioning ring 3 may be selectively applied to one region of small axial extent at a front end S of thin-walled, unattached end 20 of hollow shaft 2. In this manner, the appropriate forces or torques are selectively introduced so that they are used for producing the desired clamping action between hollow shaft 2 and drive shaft 1 and not for (elastically) deforming hollow shaft 2 or tensioning ring 3 in a manner that does not contribute to producing the clamping action.

On the other hand, in spite of the small extent or dimensions of effective clamping surface 31 in the axial direction, tensioning ring 3 has a large enough extent in the axial direction which permits clamping forces of large enough magnitude to be produced, using a stable enough tensioning ring 3 and a not-too-small clamping screw 4.

FIG. 2 shows a modification of the arrangement of FIG. 1, a difference being that tensioning ring 3 in second axial section 32 contiguous to first axial section 31 forming the effective clamping surface does not have any cut-out. Rather, the two axial partial sections 31, 32 of inner surface 30 of tensioning ring 3 are identical in design. Instead, in axial partial area 20a directly contiguous to end face S of hollow shaft 2, unattached end section 20 of hollow shaft 2 has a larger thickness than in further partial area 20b that is axially contiguous thereto. Both partial areas 20a, 20b of unattached end section 20 of hollow shaft 2 are embraced by tensioning ring 3; however, only partial area 20a, which is directly contiguous to end face S, on outer wall 23, has such a distance in radial direction R from center axis M of hollow shaft 2 that it rests against inner surface 30 of tensioning ring 3. Thus, first axial section 31 of inner surface 30 of tensioning ring 3 forming the effective clamping surface is that section on which outer wall 23 of hollow shaft 2 rests via an axial partial area 20a. On the other hand, second axial partial section 32 axially contiguous thereto, of inner surface 30 does not have any contact with corresponding axial partial section 20b of outer wall 23 of hollow shaft 2.

FIG. 3 illustrates a rotary encoder having a hollow shaft 2 which includes an encoder disk 50 fastened to hollow shaft 2 and a scanning device 61, composed of a light source 60 and a detector unit 62, for scanning encoder disk 50. Situated at one axial end section 20 of hollow shaft 2 is a tensioning ring 3, whose one axial end rests against a shoulder of hollow shaft 2 and whose other axial end is axially secured by a circumferential projection 29 of hollow shaft 2. This tensioning ring 3, which, in turn, rests with one axial partial section 31 against associated end section 20 of hollow shaft 2, is described in the following on the basis of FIGS. 4a through 4c.

With regard to the existence of a partial section 31 via which tensioning ring 3 is able to act on end section 20 of hollow shaft 2, tensioning ring shown in FIGS. 3 and 4a through 4c conforms with that in FIG. 1.

However, a difference between the tensioning ring shown in FIGS. 3 and 4a through 4c and that shown in FIG. 1 is that tensioning ring 3 in accordance with FIGS. 3 and 4a through 4c rests via three clamping points 34, spaced apart equidistantly from one another in circumferential direction U, (and thus not over its entire surface) on outer wall 23 of corresponding axial partial area 20a of hollow shaft 2. These clamping points 34 are formed by inwardly directed projections of inner surface 30 of tensioning ring 3.

Between two clamping points 34, in each case, tensioning ring 3 (considered in circumferential direction U) has wall regions of such a small thickness that they act as a hinge. This may further improve the selective introduction of clamping forces using tensioning ring 3 into hollow shaft 2. Therefore, the greatest possible share of the torque produced by clamping screw 4 may be converted to effect a clamping-type fastening between hollow shaft 2 and drive shaft 1, and only a small share of the torque is converted into deformation force leading or which may otherwise lead to a deformation of tensioning ring 3 and/or of hollow shaft 2 that is not conducive to clamping.

Figure 4A:
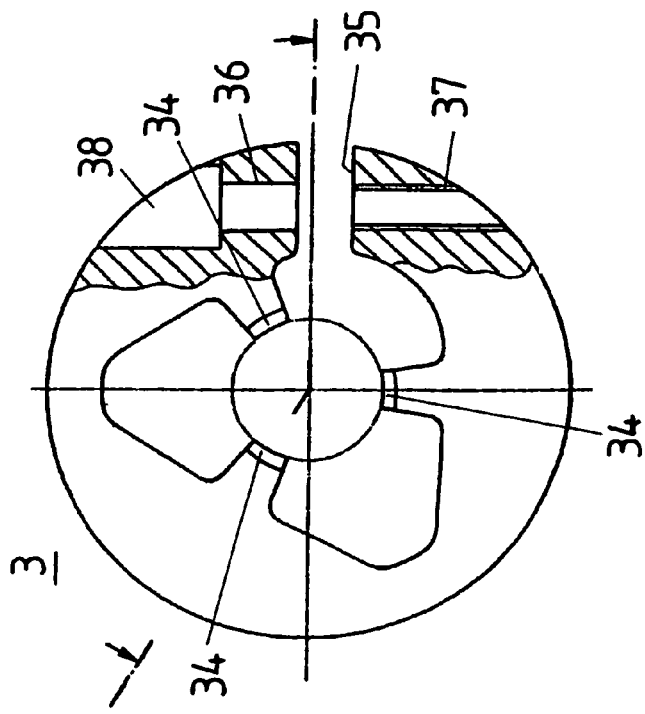
FIG. 4a illustrates a front view of the tensioning ring of FIG. 3.
Figure 4C:
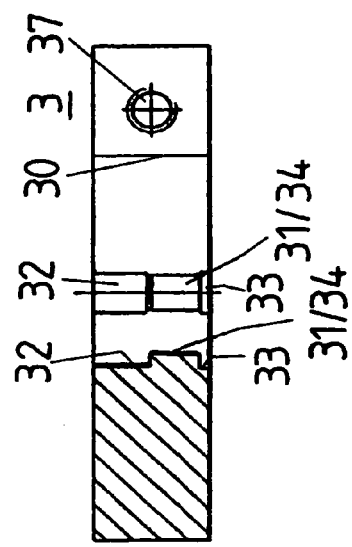
FIG. 4c illustrates a cross-sectional representation of the tensioning ring of FIG. 3.
Figure 4B:
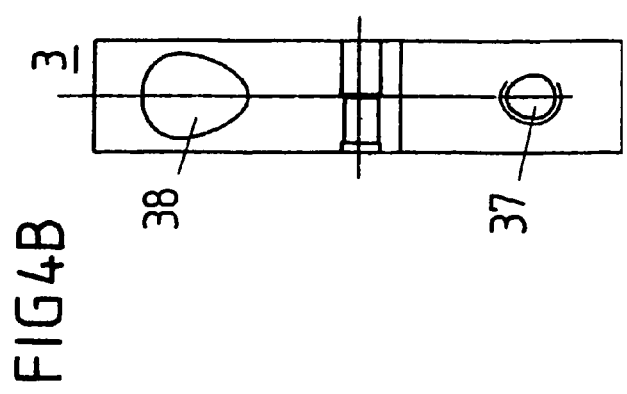
FIG. 4b illustrates a side view of the tensioning ring of FIG. 3.

It is also discernible from FIGS. 4a through 4c that clamping screw 4 passes tangentially through radial slot 35 of tensioning ring 3 and, in the process, penetrates on the one side of radial slot 35 (directly contiguous to the screw head) through hole 36 and, on the other side of radial slot 35, into tapped hole 37 provided with an internal thread.

In the previously described exemplary embodiments, hollow shaft 2 is designed in the particular clamping region to be sufficiently thin-walled that a selective deformation of the end section of hollow shaft 2 using the desired clamping action is made possible by the torques that are able to be applied by tensioning ring 3. Alternatively, however, the deformability of the end section of hollow shaft 2 being used as the clamping region may also be attained by slots. A benefit of a hollow shaft whose clamping region is designed, over the circumference, to be uniformly thin-walled and, thus, uniformly deformable may be derived from the ability of a tensioning ring to be freely positioned using individual clamping points, spaced apart from one another in circumferential direction U, in accordance with FIGS. 4a through 4c.

What is claimed is:

1. An arrangement, comprising:
   a tubular element connectable to a body extending into the tubular element; and
   a tension ring adapted to embrace, by an inner surface, an outer wall at an end of the tubular element, the tension ring adapted to extend axially along the tubular element and adapted to apply a clamp force to the tubular element so that the tubular element acts via an inner wall of the tubular element on the body extending into the tubular element to clamp the tubular element on the body;
   wherein the tension ring includes a first axial section and a second axial section contiguous in an axial direction to the first axial section and is adapted to rest by only the first axial section of the inner surface against the outer wall of the tubular element and is adapted to exert a clamp action on the outer wall of the tubular element;
   wherein at the end, a wall of the tubular element on which the tension ring is to be positioned includes a smaller thickness than a contiguous axial region of the tubular element;
   wherein the first axial section is configured to face an end face of the end of the tubular element;
   wherein the second axial section is configured so that the inner surface of the tension ring does not rest against the outer wall of the tubular element in the second axial section; and
   wherein a distance from a center axis of the tubular element to the outer wall of the tubular element, in an area of the outer wall of the tubular element against which the first axial section is configured to rest, is larger than a distance from the center axis of the tubular element to the outer wall of the tubular element in an area embraced by the at least one second axial section.

2. The arrangement according to claim 1, wherein an extent of the at second axial section in the axial direction is greater than an axial extent of the first axial section.

3. The arrangement according to claim 1, wherein, in the area against which the first axial section is configured to rest against the outer wall of the tubular element, the tubular element includes one of a thickened region and an outwardly projecting protuberance.

4. An arrangement, comprising:
   a tubular element connectable to a body extending into the tubular element; and
   a tension ring adapted to embrace, by an inner surface, an outer wall at an end of the tubular element, the tension ring adapted to extend axially along the tubular element and adapted to apply a clamp force to the tubular element so that the tubular element acts via an inner wall of the tubular element on the body extending into the tubular element to clamp the tubular element on the body;

wherein the tension ring includes a first axial section and a second axial section contiguous in an axial direction to the first axial section and is adapted to rest by only the first axial section of the inner surface against the outer wall of the tubular element and is adapted to exert a clamp action on the outer wall of the tubular element;

wherein at the end, a wall of the tubular element on which the tension ring is to be positioned includes a smaller thickness than a contiguous axial region of the tubular element;

wherein the first axial section is configured to face an end face of the end of the tubular element; and wherein the tubular element includes a hollow shaft of a rotary encoder connectable to a drive shaft extending into the hollow shaft.

5. An arrangement, comprising:

a tubular element including a hollow shaft of a rotary encoder;

a body extending into the hollow shaft, the body including a drive shaft of a machine; and a tension ring adapted to embrace, by an inner surface, an outer wall of the tubular element, the tension ring adapted to extend axially along the tubular element and adapted to apply a clamp force to the tubular element so that the tubular element acts via an inner wall of the tubular element on the body extending into the tubular element to clamp the tubular element;

wherein the tension ring is adapted to rest by only a first axial partial section of the inner surface against the outer wall of the tubular element and is adapted to exert a clamp action on the outer wall of the tubular element.

6. The arrangement according to claim 5, wherein the tension ring includes a second axial partial section contiguous in an axial direction to the first axial partial section, wherein the second axial partial section is configured so that the inner surface of the tension ring does not rest against the outer wall of the tubular element in the second axial partial section, and wherein an extent to the second axial partial section in the axial direction is greater than an axial extent of the first axial partial section.

7. The arrangement according to claim 6, wherein the inner surface of the tension ring in the second axial partial section has a greater distance from a center axis of the tubular element than in the first axial partial section.

8. The arrangement according to claim 7, wherein the tension ring includes a cut-out in the at least one second axial partial section.

9. The arrangement according to claim 5, wherein, at the end face, the tubular element includes an outwardly protruding projection.

10. The arrangement according to claim 9, wherein the outwardly protruding projection is arranged as a circumferential flange adapted to axially secure the tension ring.

11. The arrangement according to claim 5, wherein the tubular element includes a shoulder in a transition area from an axial region of the end to the contiguous axial region.

12. The arrangement according to claim 11, wherein the tension ring is configured to be positioned in an axial direction directly next to the shoulder.

13. The arrangement according to claim 12, wherein the tension ring is configured to rest against the shoulder.

14. The arrangement according to claim 5, wherein the tension ring includes a plurality of clamp points spaced apart along a circumference of the tubular element configured to rest against the outer wall of the tubular element.

15. The arrangement according to claim 14, wherein the inner surface of the tension ring includes three spaced apart clamp points along the circumference of the tubular element.

16. The arrangement according to claim 14, wherein the clamp points include a plurality of inwardly protruding projections of the inner surface of the tension ring integrally molded on the inner surface.

17. The arrangement according to claim 14, wherein the clamp points are spaced apart at a constant, equal distance from one another along the circumference of the tubular element at the inner surface of the tension ring.

18. The arrangement according to claim 14, wherein the tension ring includes a weak spot arranged between each two adjacent clamp points.

19. The arrangement according to claim 18, wherein the weak spot is adapted to operate as a joint.

20. The arrangement according to claim 5, wherein the tension ring is adapted to embrace, by the inner surface, the outer wall at an end of the tubular element;

wherein at the end, the wall of the tubular element on which the tension ring is to be positioned includes a smaller thickness than a contiguous axial region of the tubular element; and wherein the first axial partial section is configured to face an end face of the end of the tubular element.

21. The arrangement according to claim 5, wherein a distance from a center axis of the tubular element to the outer wall of the tubular element, in an area of the outer wall of the tubular element against which the first axial partial section is configured to rest, is larger than a distance from the center axis of the tubular element to the outer wall of the tubular element in an area embraced by the second axial partial section.

22. The arrangement according to claim 21, wherein, in the area against which the first axial partial section is configured to rest against the outer wall of the tubular element, the tubular element includes one of a thickened region and an outwardly projecting protuberance.

* * * * *